United States Patent [19]

Maroldo et al.

[11] Patent Number: 4,957,897

[45] Date of Patent: Sep. 18, 1990

[54] CARBONACEOUS ADSORBENTS FROM PYROLYZED POLYSULFONATED POLYMERS

[75] Inventors: Stephen G. Maroldo, Harleysville; William R. Betz, Port Matilda; Noah Borenstein, Oreland, all of Pa.

[73] Assignee: Rohm and Haas Company, Philadelphia, Pa.

[21] Appl. No.: 307,554

[22] Filed: Feb. 7, 1989

Related U.S. Application Data

[62] Division of Ser. No. 150,183, Jan. 29, 1988, Pat. No. 4,839,331.

[51] Int. Cl.$^5$ .......................... B01J 20/30; B01J 20/20; B01J 39/24; C01B 31/10
[52] U.S. Cl. .................................... 502/432; 73/23.35; 55/67; 55/74; 55/197; 55/387; 210/681; 502/181; 502/182; 502/412; 502/417; 502/418; 502/426; 502/430; 502/433; 502/437
[58] Field of Search ............... 502/437, 432, 431, 430, 502/417, 416, 180, 182, 181; 423/445, 449; 73/23.1

[56] References Cited

U.S. PATENT DOCUMENTS

| | | | |
|---|---|---|---|
| 3,988,919 | 11/1976 | Talmi et al. | 73/23.1 |
| 4,040,990 | 8/1977 | Neely | 521/29 |
| 4,237,107 | 12/1980 | Gillot et al. | 423/449 |
| 4,265,768 | 5/1981 | Beasly et al. | 521/29 |
| 4,536,521 | 8/1985 | Haq | 521/63 |
| 4,775,655 | 10/1988 | Edwards et al. | 502/416 |
| 4,839,331 | 6/1989 | Maroldo et al. | 502/416 |

FOREIGN PATENT DOCUMENTS

| | | | |
|---|---|---|---|
| 37594 | 4/1978 | Japan | 502/417 |
| 1443242 | 7/1976 | United Kingdom | 423/445 |

*Primary Examiner*—Paul E. Konopka
*Attorney, Agent, or Firm*—John E. Taylor, III

[57] ABSTRACT

Carbonaceous adsorbent particles having multimodal pore size, including micropores and macropores, with improved adsorptive and separative properties, are prepared by partial pyrolysis of polysulfonated macroporous precursor resins, said resins being in turn derived from macroporous poly(vinylaromatic) resins. The particles may be further treated by activating with reactive gases or by functionalization.

18 Claims, No Drawings

CARBONACEOUS ADSORBENTS FROM PYROLYZED POLYSULFONATED POLYMERS

This is a division of Ser. No. 150,183, filed 1-29-88, now U.S. Pat. No. 4,839,331.

This invention relates to adsorbent particles, and more particularly to partially pyrolyzed particles prepared from macroporous polysulfonated polymers It further relates to a process for making such partially pyrolyzed particles, a process for their further activation and functionalization, and the use of such particles as components of separative and adsorptive systems.

BACKGROUND OF THE INVENTION

The high surface and internal areas of activated carbon have made it useful in many separative, adsorptive, and purification processes. Preparation of improved carbonaceous adsorbents by pyrolysis of synthetic resins, such as crosslinked polystyrene, or of polymers treated with oxidants to increase the yield of carbonaceous product, has been known for some years. Useful adsorbents from partially pyrolyzed porous precursors, especially those based on crosslinked, stabilized (treated with fixatives or oxidants to prevent depolymerization) polyvinyl aromatics, represent an improved version of such materials. Neely, U.S. Pat. No. 4,040,990, which is hereby incorporated into the present specification by reference, and in Carbon, 19, 27 (1981), describes controlled partial pyrolysis of macroporous monosulfonated (or otherwise fixated) polystyrene to produce charred beads maintaining the macroporous structure of the precursor polymer but with microporosity created during heat treatment. Neely further teaches adsorptive and purification uses for such pyrolyzed polymers; see also U.S. Pat. No. 4,063,912 and U.S. Pat. No. 4,267,055. The term "carbonaceous adsorbent" as used herein refers to particles prepared by the process of Neely from sulfonated macroporous polystyrene resins.

During the many years of research on polystyrene-based cation exchange resins based on the introduction of sulfonic acid by sulfonation with sulfuric acid or chlorosulfonic acid, methods have been found to increase the resin capacity by introduction of more than one sulfonic acid per aromatic ring. Methods for polysulfonation are taught, inter alia, by Corte et al., U.S. Pat. No. 3,158,583, for conventional, non-macroporous resins.

There is little specific information in the art as to preparation of polysulfonated macroporous resins, although such have been marketed and described in the trade literature U. S. Pat. No. 4,224,415 claims a process for sulfonating macroporous polymers with a sulfonating agent selected from the group of concentrated sulfuric acid, oleum, sulfur trioxide, and chlorosulfonic acid. It fails to teach that polysulfonated resins result from such a sulfonation, nor does it teach any advantages for the resulting resins.

British Pat. No 1,525,420, in a broad description of method for rendering infusible various porous high molecular weight compounds (including macroporous resins), and then calcining them, relates techniques for polysulfonation earlier described by Corte et al. among those suitable for creating infusibility. No characterization data are given for the polymer prior to calcination. Preferred infusibility reactants are sulfur trioxide, sulfuric acid, or chlorosulfonic acid. This reference discloses pyrolysis of macroporous resins treated with 15% fuming sulfuric acid and pyrolyzed, and describes an experimental method for determining the porosity of the pyrolyzed material down to 2-5 nm. The results described in the tables of the reference show the absence of any porosity development below 5 nm, and multimodal porosity is not taught. In contrast, Neely in the cited references fully shows the development of microporosity for monosulfonated macroporous resins. Further, the British patent is silent about the processing advantages observed in pyrolysis of polysulfonated resins.

Japanese Kokai 52-30800, filed at the same time and by the same applicant as British 1,525,420, teaches broadly and with very limited exemplification several methods for making macroporous resins and a large variety of methods for making the porous polymer infusible, including but not distinguishing sulfuric acid, sulfuric acid anhydride, sulfur dioxide, and chlorosulfonic acid. A polystyrene in which micropores are produced by extraction of a water-soluble polymer is exemplified as being treated with fuming 15% sulfuric acid at 80° C. for an unknown time and pyrolyzed, but the data show no micropore development below 15 nm.

Japanese Kokai 53-50088, to the same applicant as British 1,525,420 and Kokai 52-30800, teaches preparation of improved adsorbents by pyrolyzing infusible resins made from monomer mixtures containing multiple, non-conjugated, ethylenically unsaturated groups by suspension polymerization in the presence of a precipitant liquid that is a solvent for the monomers and does not swell the polymer. The porous resin so produced is made infusible by a process such as sulfonation or nitration and then pyrolyzed. It is stated that the method can be used to produce pore volumes of 0.1 cc/g., preferably 0.3 cc/g and pore sizes of 1 to 5000 nm, preferably 5 to 1000 nm. The single experiment reported teaches preparation of a non-macroporous (gellular) styrene/divinylbenzene copolymer, sulfonation for six hours at 110° C. with 15% fuming sulfuric acid, and pyrolysis at a temperature of 1000° C., achieved by heating under nitrogen gas at a rate of 300° C./hour. The resulting resin was reported to have an average pore diameter of 20 nm and 0 6 cc/g of pores with diameters of 5 nm or more, with no mention of smaller pore sizes or of macropores. Activation of the pyrolyzed resin with steam at 800° C. to yield a resin with a surface area of 1100 $m^2/g$. is noted. There is no direct demonstration in the patent that pore sizes and adsorptive behavior of the present invention can be achieved, as there is no exemplification of polysulfonation conditions being preferred, or of such being applied to a macroporous resin.

In Japanese Kokai 62-197308 is taught a method for producing a porous carbon material having a large void fraction by pyrolysis of a synthetic, crosslinked, styrene-divinylbenzene polymer which has been wetted with concentrated sulfuric acid under reduced pressure and then carbonized in an inactive gas stream.

In Japanese Pat. Application 62-76093, filed Mar. 31, 1987, is taught the use of commercially available macroporous resins from Rohm and Haas Co. prepared by the method of Neely for the removal of pyrogens from water. The examples are merely duplicates of those examples presented in British Pat. No. 1,525,420 discussed above and shown not to produce a microporous structure, except that the newer application further discloses further activation by steam for two hours at 800° C., with results exactly those disclosed in Japanese Kokai 53 - 50088.

THE INVENTION

We have discovered adsorbent particles having high surface area and a minimum volume contributed by micropores of about 0.02 cm$^3$/g, preferably about 0.05 cm$^3$/g, and more preferably about 0.1 cm$^3$/g, which particles are made by the partial pyrolysis of microporous, polysulfonated resins. We have further discovered a process by which these adsorbent particles are made, which process comprises partially pyrolyzing, in an inert atmosphere, at temperatures from about 300° to about 1200° C., polysulfonated, macroporous, vinylaromatic copolymers. We have further discovered an embodiment of the present invention in which the partially pyrolyzed adsorbent particles are activated by heating in an activating atmosphere. We have discovered that these adsorbent particles are useful for adsorption of gases, vapors, liquids and the like onto their surfaces, for such purposes as purification, removal and separation, including chromatographic separation, and that they are also useful for the preparation of functionalized resin particles by subjecting them to known functionalization reactions.

As used herein, macroporous copolymers include macroporous or macroreticular copolymers prepared by suspension polymerization in the presence of a precipitant, as described in U.S. Pat. No. 4,256,840 and U.S. Pat. No. 4,224,415, and copolymers into which large pores have been introduced by other methods as for example the technique described in U.S. Pat. No. 3,122,514. The resins prepared from macroporous copolymers are called macroporous resins. Polysulfonation, as used herein, refers to a sulfonation process that is sufficiently vigorous to introduce an average of more than one sulfonate group per accessible aromatic nucleus. Such vigorous sulfonation is accompanied by the formation of a significant number of sulfone crosslinks, in which sulfonate groups bridge between two aromatic nuclei to form —SO$_2$— crosslinks.

The vinyl aromatic polymers of the present invention are those in which at least 50% of the units contain a vinylaromatic group. Preferred are vinylaromatic polymers in which at least 90% of the units contain a vinylaromatic group. Especially preferred are vinylaromatic polymers where at least 98% of the units contain a vinylaromatic group. Vinylaromatic monomers include, among others, styrene, alpha-methylstyrene, vinyltoluene, p-methylstyrene, ethyl-vinylbenzene, vinylnaphthalene, divinylbenzene, trivinylbenzene, vinylisopropenylbenzene, diisopropenylbenzene, and the like. Especially preferred are styrene and divinylbenzene (which will normally contain some ethylvinylbenzene).

As the polysulfonation produces both sulfonate and sulfone groups, analytical identification of the polysulfonated resin is best done by conventional microanalytical procedures for elemental sulfur content. A polysulfonated resin, as used herein, is one in which the microanalytical value for sulfur introduced into the resin molecular structure by the sulfonation process is at least 1.04 times, preferably at least 1.07 times, and more preferably at least 1.16 times the value for the sulfur so introduced by conventional, sulfuric acid sulfonation. In general, conventional, sulfuric acid sulfonation of lightly crosslinked copolymers will introduce approximately the same amount of sulfur as would theoretically be expected for complete monosulfonation of the copolymer. In highly crosslinked copolymers, however, sulfonation tends to occur predominantly at or near the surface of the copolymer particle, and to a lesser extent at increasing distances from the surface. Polysulfonation exhibits a similar phenomenon; a highly crosslinked, polysulfonated copolymer may contain less sulfur than theoretically expected for monosulfonation, yet the accessible aromatic nuclei will be polysulfonated.

Sulfone crosslinking occurs under the same vigorous reaction conditions required to achieve polysulfonation, and is therefore present in polysulfonated resins. The preparation of such resins is described in Romanian Pat. No. 56,980 and in U.S. Pat. No. 3,158,583. Besides the two-step sulfonations described in these references, the copolymers may also be polysulfonated with oleum alone, to obtain a polysulfonated resin operable in the present invention. Other procedures for preparing polysulfonated aromatic cation exchange resins will be apparent to those skilled in the art. The preferred copolymers to be polysulfonated are those prepared by polymerizing a monovinyl aromatic monomer, preferably styrene, and a polyvinyl crosslinking monomer, preferably diisopropenylbenzene or divinylbenzene, to produce macroporous copolymers. Particularly preferred are copolymer particles produced in bead form by suspension polymerization, and more particularly preferred are those in which a precipitant such as those taught in U. S. Pat. No. 4,256,840 is included in the suspension mixture to produce macroporous polymer beads.

The polyvinyl crosslinker level in the copolymer may be from about 2% to about 98% by weight of the copolymer, with the preferred range being from about 3% to about 80% by weight of the copolymer. Suitable crosslinkers include those discussed by Neely in U.S. Pat. No. 4,040,990. Combinations of crosslinkers may also be used.

The precipitant may be present in ratios from about 20 parts per 100 parts of monomer to about 600 parts per 100 parts of monomer, depending on the crosslinking level and precipitant used.

In the present text, the term "macropore" is used to mean pores of average diameter from about 3.5 nm to about 10000 nm, although values of about 3.5 nm to about 50 nm are preferred. "Micropore" refers to pore values of average diameter about 0.10 nm to about 3.5 nm, preferably about 0.15 nm to about 2 nm. A sub-category of micropores is "mesopores", which term is used herein to mean pores having an average diameter from about 0.6 nm to about 3.5 nm.

Although resin beads of the size produced by conventional suspension polymerization processes are a useful size for the further reactions and end uses, the process may be conducted on larger or smaller beads, and even on ground macroporous resins produced in non-bead form. For adsorbent and separative use, the resins may be further ground or selectively sieved to produce the desired particle size.

A preferred method for conducting the polysulfonation is to contact the macroporous resin with fuming sulfuric acid for a period of from about 5 hours to about 20 hours or more at a temperature of from about 100° to about 150° C. Particularly preferred is treatment at about 120° C for a period of about 16 hours. The fuming sulfuric acid may have a specific gravity of from about 1.88 to about 2 00 and is used in amounts of from about 100% to about 2000% or more, based on the weight of the macroporous resin. A preferred set of conditions is to use 20% oleum, specific gravity 1 915, at from about 1400 to about 1500%. The polysulfonated resin is preferably hydrated, then washed to remove acid and dried prior to calcining. Care must be taken in the hydration step not to shatter the resin by direct contact with water; hydration with diluted sulfuric acid is preferred.

The pyrolysis may be conducted by any of the methods taught by Neely, U.S. Pat. No. 4040990. Preferred is a controlled pyrolysis at temperatures from about 300° C. to about 1200° C. for a period of about 15 minutes to about two hours; in the absence of activating chemicals, the pyrolysis may be maintained longer at the upper temperature with very little change taking place in weight loss or pore size development. The polymer may be agitated and/or heated with steam or hot gases or may be heated under static conditions under nitrogen. A fluidized bed treatment may be used, in which heated nitrogen is passed upward through the bed, the gas also serving to agitate the bed particles. The polymer may be introduced directly into the oven at the highest temperature desired, or may be heated in several steps to the final temperature.

A distinct advantage in processing the polysulfonated resins of the present invention, compared with the monosulfonated resins taught by Neely, is observed in the production of little or no tarry products (which can clog the gas exhaust line and foul the pyrolysis apparatus), and any tars that are produced being of lower molecular weight and thus more volatile. The resulting pyrolyzed polysulfonated resins exhibit less weight loss than their monosulfonated counterparts under similar pyrolysis conditions, which means the yield of useful carbonaceous material is higher. Without wishing to be bound by theory, it may be that the improved evolution of gases during pyrolysis may contribute to the higher pore volume caused by outgassing.

The carbonaceous material produced from the polysulfonated material may be used as such, or it may be activated further by processes known to the art such as exposure to various activating gases, including oxygen, steam, water, ammonia, carbon monoxide, carbon dioxide, and the like, at temperatures from about 300° C. to about 1200° C. or more. Activation in the presence of steam at about 800° C. to about 1000° C. is preferred.

It is also possible to conduct the pyrolysis in the presence of an activating gas rather than in an inert gas such as nitrogen. At temperatures below about 800° C., pyrolysis is the kinetically dominating process, and little effect of the activating gas is seen at relatively short pyrolysis times. At pyrolysis temperatures above about 800° C., or with lengthy exposure to the activating gas at temperatures between about 300° C. and about 800° C., both pyrolysis and activation can be accomplished. Activation with reactive gases is an optional process sometimes desirable for the modification of adsorbent properties, but is not a necessary part of the invention.

The carbonaceous particles of the present invention may be functionalized by methods such as taught in Beasley et al., U.S. Pat. No. 4,265,768, which is hereby incorporated into the present disclosure by reference, as by treating it with a functionalizing agent, to incorporate ion exchange functional groups or precursors thereof; the resulting functionalized particles are useful as ion exchange resins.

The particles may be chemically treated to adsorb chemicals which react with materials to be separated, so as more cleanly to separate said materials. For example, a resin intended as a solid phase for chromatographic separation may be treated with a desorbable reactive agent such as hydrogen bromide; during the separation of ethylene oxide in admixture with other gases the ethylene oxide is converted to ethylene bromohydrin, which is readily separated and detected.

As will be seen from the examples below, the pyrolyzed polymer particles of this invention surpass their monosulfonated counterparts in their ability to separate certain mixtures of small molecules; they also exhibit a significantly higher volume of micropores, as well as cleaner and larger pore volumes in the macroporous range.

The pyrolyzed polysulfonated polymers of the present invention are useful in those applications where pyrolyzed resins based on monosulfonated macroporous resins are useful, such as in the purification of groundwater, especially for removal of endotoxins as taught in Agui et al., Glossary of Manuscripts for Presentation to the Chemical Society of Japan, Nov., 1987; in the adsorption of noxious gases; in removal of noxious organic materials; in the separation of streams of organic or inorganic gases; in the analysis of such gaseous mixtures, such as mixtures of the noble gases, and the like. Pyrolyzed resins further activated with nitrogen may be useful as supports for catalysts for chemical reactions, such as molybdenum- based catalysts for the conversion of asphaltenes.

The following examples are intended to illustrate the invention, and not to limit it except as it is limited in the claims. All percentages herein are by weight unless otherwise indicatd, and all reagents are of good commercial quality unless otherwise indicated. As used herein, the abbreviations "cc" and "cm$^3$" both mean "cubic centimeter".

EXAMPLE 1

This example describes a method for forming a macroporous resin suitable for polysulfonation and pyrolysis. By methods described in U.S. Pat. No. 4,382,124, a macroporous polymer was prepared from styrene containing sufficient commercial divinylbenzene (55% purity) to charge 19.5% divinylbenzene (active). Methyl amyl alcohol, 33.4% on monomer, was employed as precipitant. Spherical particles were produced 0.85–2.5 mm in diameter. Such resins typically have a pore diameter range of about 60 to about 300 nm, a total porosity of about 0.36 cm$^3$ per gram of resin, and exhibit little or no microporous or mesoporous structure.

EXAMPLE 2

This comparative example describes conditions for the monosulfonation process known in the prior art. By the method taught in Neely, U.S. Pat. No. 4,040,990, the copolymer of Example 1 was treated with 99% sulfuric acid at a weight ratio of 6 parts acid to 1 part resin for three hours at 122° C., followed by slow dilution with deionized water at 100° C. over three hours. The resin was then further washed with deionized water and vacuum dried. The sulfur content was 15.85%, or 93.5% of the theoretical value for complete monosulfonation.

EXAMPLE 3

This example describes conditions for polysulfonation to produce the resins pyrolyzed to form the adsorbents of the present invention. To 120 parts of the polymer of Example 1 was added 1720 parts by weight of 20% oleum. The mixture was heated to 120° C. overnight (16 hours). Hydration of the sulfonated resin was achieved by adding dropwise to the reaction, after cooling to about 100° C., 250 parts of water followed by removal of about 200 parts of liquid. The quench procedure was repeated three times. The resin was then washed by addition of 400 parts water with stirring, the liquid removed by suction, and the resin placed in a container suitable for containing the resin under a flow of deionized water. Water was allowed to flow through the container until color throw was minimized. The water was then suctioned off, the resin rinsed three times with 1000 parts methanol and dried under vacuum at 80° C. The yield of resin isolated was 298g. The sulfur content was 20.69%, or 122% of the theoretical value for complete monosulfonation.

EXAMPLE 4

This example describes conditions for pyrolysis at 800° C. The polymers of Examples 2 and 3 were pyrolyzed in two different ways which were judged to be equivalent as determined by BET surface area. The pore size distributions were determined as described in the Neely publication cited above. The BET measurement of surface area/unit weight was determined by mercury porosimetry. The results of the pore size distributions in Table 1, below, show the polysulfonated precursors (Examples 4A and 4B) produce higher pore volumes than do precursors produced by standard sulfonations (Example 4C and 4D).

The pyrolysis conditions are as follows:

i. A twenty gram sample of sulfonated copolymer was placed in a 2.54 cm quartz tube between two plugs of quartz wool. The tube was purged with nitrogen and the tube place in a tube furnace at ambient temperature. The tube was then heated to 800° C. over approximately 1 hour and then held at 800° C. for ½ hour. The adsorbent was cooled under nitrogen and then weighed to determine yield.

ii. A twenty gram sample of sulfonated copolymer was placed in a 2.54 cm quartz tube between two plugs of quartz wool. The tube was then purged with nitrogen and the tube placed in a tube furnace that had been preheated to 500° C. After approximately ½ hour, the furnace was heated to 800° C. and held at that temperature for ½ hour.

TABLE 1

| Preparation/ pyrolysis method | Sulfonation[1] | BET Surface ($m^2/g$) | Pore Volume (cc/g) 0.43– 0.6 nm | 0.6– 3.5 nm | 3.5– 30 nm |
| --- | --- | --- | --- | --- | --- |
| 4A Ex.3/4(i) | A | 496 | 0.219 | 0.0152 | 0.44 |
| 4B Ex. 3/4(ii) | A | 493 | 0.221 | 0.0178 | 0.42 |
| 4C Ex. 2/4(i) | B | 401 | 0 108 | 0.0060 | 0.35 |
| 4D Ex. 2/4(ii) | B | 402 | 0.108 | 0.0038 | 0.35 |

[1]A = polysulfonation
B = monosulfonation

It was observed that pyrolysis of the monosulfonated samples was accompanied by more non-volatile tar than in the preparation from the polysulfonated samples; the volatile material separated from the polysulfonated resin was lower in viscosity than that from the monosulfonated resin.

EXAMPLE 5

This example describes results for pyrolysis of monosulfonated and polysulfonated resin at 500° C., and also exemplifies pyrolysis of a polysulfonated resin at 1100° C. The resins of Examples 2 and 3 were pyrolyzed at 500° C. maximum by the technique of Example 4b, except the temperature was not taken above 500° C. In a similar manner, sample 5C was prepared by pyrolysis of the polysulfonated resin of Example 3 at a maximum temperature of 1100° C. The results of this example are in Table 2 below.

TABLE 2

| Sample | Preparative pyrolysis method | Sulfonation Conditions | BET Surface Area, $m^2/g$ |
| --- | --- | --- | --- |
| 5A | Ex. 3/500° | Polysulfonation | 544 |
| 5B | Ex. 2/500° | Standard | 471 |
| 5C | Ex. 3/1100° | Polysulfonation | 520 |

EXAMPLE 6

This example teaches preparation of monosulfonated and polysulfonated resins from several macroporous precursors. In a manner similar to Example 1, macroporous polymers of styrene and crosslinking monomers were prepared in the presence of a precipitant. All starting resins had a particle size, as measured by standard screen techniques, which passed through a 1.18 mm sieve and was retained on a 0 300-mm sieve. DVB is divinylbenzene, MAmAlc is methyl amyl alcohol.

The samples were subjected either to the polysulfonation conditions of Example 3, or the monosulfonation conditions of Example 2. The results of this example are in Table 3 below.

TABLE 3

| Sample | Cross-linking (% DVB) | Precipitant (% MAmAlc) | Polysulfonate Conditions | Sulfur, % (Polysulfonate, %)[1] |
| --- | --- | --- | --- | --- |
| 6A | 12 | 31.5 | Example 3 | 19.03 (111) |
| 6B | 3.2 | 39.5 | Example 3 | — |
| 6C | 4 | 45 | Example 3 | — |
| 6D[2] | 20 | 45 | Example 3 | 21.09 (124.6) |
| 6E | 12 | 31.5 | Example 2 | — |
| 6F | 4 | 45 | Example 2 | — |
| 6G | 20 | 45 | Example 2 | — |

[1]Values in parentheses are calculated as percentage of the theoretical value for complete monosulfonation.
[2]Total pore volume above 2 nm = 0.24 ml/g; average pore diameter = ca. 45 nm; only 4.4% of the pore volume from pores having a pore diameter below 6 nm.

EXAMPLE 7

This example teaches the preparation of a suitable polysulfonated precursor from a highly crosslinked resin; it further illustrates that pyrolysis of the polysulfonated precursor results in higher yields of pyrolyzed polymer weight than the corresponding monosulfonated precursor. A macroporous polymer was prepared in suspension from high purity (ca. 80%) divinylbenzene with no styrene added, and with 70% toluene as precipitant. The resulting polymer had a pore diameter/pore volume distribution as follows; although the pore volume between 2 and 4 nm diameter (roughly the onset of the micropore range) was 16.7% of the total, the volume below 2 nm diameter was not measurable. The results of this example are in Table 4 below.

TABLE 4

| Pore Diameter, nm | Pore Volume, cc/g. |
| --- | --- |
| >60 | 0 |
| 60–40 | 0 |
| 40–20 | 0.386 |
| 20–10 | 0.492 |
| 10–8 | 0.123 |
| 8–6 | 0.150 |

TABLE 4-continued

| Pore Diameter, nm | Pore Volume, cc/g. |
|---|---|
| 6-4 | 0.191 |
| 4-2 | 0.269 |
| 2-1 | 0 |

The beads were polysulfonated by the method of Example 3. Particle size of the starting polymer was as in Example 6. The sulfur content was 14.98%, which is 98.4% of the theoretical value for complete monosulfonation; in this tightly crosslinked system, it is believed polysulfonation occurs at the surface and less-than-complete sulfonation in the interior of the particle. This sample is designated as 7A. Another sample of the highly crosslinked beads was monosulfonated with concentrated sulfuric acid under the reaction conditions of Example 3, and is designated 7B. These samples were pyrolyzed (7B at two different temperatures), and the yield and surface area for the pyrolyzed products are shown in Table 5 below.

TABLE 5

| Precursor | Polysulfonated | Pyrolysis Temperature | Yield % | BET Surface Area $m_2/g$ |
|---|---|---|---|---|
| 7A | Yes | 800 | 45.0 | 693 |
| 7B | No | 800 | 20.8 | 469 |
| 7B | No | 500 | 23.6 | 489 |

EXAMPLE 8

This example demonstrates the improvements in BET surface area for polysulfonated vs. monosulfonated precursors under otherwise comparable synthesis and pyrolysis conditions, and demonstrates the extent of microporosity achieved. The polysulfonated macroporous resins of Examples 6 and 7 were subjected to the following pyrolysis conditions: Samples were placed in a quartz tube between two quartz wool plugs, the tube purged with nitrogen, and the tube was heated to 500° C. over the course of approximately ½ hour, and held ½ hour. The tube was then heated further to 800° C. over the course of ½ hour and held for ½ hour. The contents of the tube were then cooled under nitrogen. The results of this example are in Table 6 below.

TABLE 6

| Sample | Source of Resin | BET Surface Area (m²/g) | Pore Volume (cc/g) with a given pore diameter | | |
|---|---|---|---|---|---|
| | | | 0.43-0.6 nm | 0.6-3.5 nm | 3.5-30 nm |
| 8A | Ex. 6A | 472 | 0.142 | 0.002 | 0.273 |
| 8B | Ex. 6B | 222 | 0.0397 | 0 | 0.3086 |
| 8C | Ex. 6C | 459 | 0.0236 | 0 | 0.4085 |
| 8D | Ex. 6D | 521 | 0.218 | 0 | 0.9888 |
| 8E | Ex. 6E | 402 | | | |
| 8F | Ex. 6F | 381 | | | |
| 8G | Ex. 6G | 400 | | | |
| 8H | Ex. 7A | 693 | 0.141 | 0.0725 | 0.9173 |
| 8I | Ex. 7B | 489 | | | |

EXAMPLE 9

The examples demonstrates the determination of breakthrough volume parameters and illustrates the improved adsorptive capacity for the present resins. Specific retention volume, often called breakthrough volume, is a important parameter in gas chromatographic separation; it is the calculated volume (as liters/gram) of a gas required to pass through a fixed weight of adsorbent bed which causes the introduced adsorbate molecules to migrate from the front edge of the bed to the back edge of the bed.

Two L-shaped, silanized glass tubes (¼"OD"4 mm ID) were used to connect an adsorbent tube (¼" OD ×4 mm ID×10 cm length) to the injector and detector ports of a Varian 3700 gas chromatograph. A thermal conductivity detector was chosen to evoke responses for the adsorbates; helium was chosen as the carrier gas to improve adsorbate response. A flow rate of 30 milliliters/minute was chosen. Adsorbent bed weights of 0.200 grams were used. Elevated oven temperatures were selected which provided retention times (volumes) for the adsorbates ranging from 0.15 to 0.75 minutes. The data obtained, as adsorbate retention volumes, was subsequently used to construct a straight-line plot of the specific retention volume versus the reciprocal of the temperature chosen. This straight line was subsequently extrapolated to obtain the value at ambient temperature.

Breakthrough volumes for several common organic vapors are shown in Table 7 below; VCM=vinyl chloride.

TABLE 7

| Sample | Pyrolysis temp., ° | Specific Retention Volume, l/g | | | |
|---|---|---|---|---|---|
| | | $CH_2Cl_2$ | $H_2O$ | Ethane | VCM |
| 5A | 500 | 1.56 | 0.80 | 0.09 | 1.90 |
| 5B | 500 (1) | 1.49 | 0.24 | 0.04 | 0.35 |
| 4B | 800 | 31.5 | 0.10 | 0.20 | 2.52 |
| 4D | 800 (1) | 26.0 | 0.23 | 0.12 | 6.62 |

(1) Control - from monosulfonated resin precursor

EXAMPLE 10

This example demonstrates techniques for calculating chromatographic efficiency and illustrates improved performance for the polymers of the present invention. The chromatographic efficiency was measured as theoretical plates/meter for carbon dioxide, a higher value indicating improved separative ability. The pyrolyzed resins were packed in a 1.83 meter by 0.318 cm stainless steel column. Helium was the carrier gas at 30 ml/min. The column temperature was held at 35° C. for two minutes, then raised at a rate of 20° C./minute to a final temperature of 150° C. Injection and detector port temperatures were 200° C. A thermal conductivity detector at a sensitivity of 8×0.5 was used. The sample concentration was 1% for each gas present in the mixture; sample volume was 0.6 ml. Theoretical plates for carbon dioxide were calculated as $$T.P. = 5.54(t_m/t_r)^2/L$$

where L=column length, $t_r$ is peak width at ½ height, and $t_m$ is retention time expressed in length The results of this example are in Table 8 below.

TABLE 8

| Pyrolyzed Resin | Theoretical Plates/Meter |
|---|---|
| 5A | 574 |
| 5B (control) | 115 |
| 4B | 689 |
| 4D (control) | 410 |
| 8A | 253 |
| 8D | 5092 |

EXAMPLE 11

This example illustrates the ability of the polysulfonated pyrolyzed particles effectively to separate gases. Separate samples of the resins described in Examples 4, 5, or 8 were charged to a gas chromatographic separations tube and used as follows to separate nitrogen, carbon monoxide, carbon dioxide, methane, acetylene, ethylene, and ethane. With monosulfonated sample 4D, the nitrogen and carbon monoxide are not resolved, the remaining peaks are fairly broad, and baseline separation (to allow quantification) of the two-carbon hydrocarbons is not achieved. With polysulfonated sample 4B, all peaks are sharper, qualitative separation of the CO and nitrogen peaks is observed, and the baseline separation of all the two-carbon hydrocarbons is acceptable. With polysulfonated sample 8H, the separation of CO and nitrogen is clean and can be quantified, and all other peaks remain sharp with baseline separation. The results of this example are in Tables 9 and 10 below.

TABLE 9

| Example | Theoretical Plates (Plates/meter) | Type of Sulfonation |
|---|---|---|
| 5B | 111 | Mono- |
| 5A | 492 | Poly- |
| 4C,D | 269 | Mono- |
| 4A,B | 673 | Poly- |
| 8H | 1280 | Poly- |
| 8D | 5085 | Poly- |

TABLE 10

Retention Time (min)
(Peak Width at Half Height, (mm))

| Example | Carbon Monoxide | Methane | Carbon Dioxide | Acetylene | Ethylene | Ethane |
|---|---|---|---|---|---|---|
| 5B | — | 1.36 | 4.03 | — | 5.88 | 6.59 |
|  |  | (4.5) | (6.7) | — | (U) | (U) |
| 5A | 0.83 | 2.74 | 5.06 | 6.83 | 7.51 | 8.37 |
|  | (U) | (3.9) | (4.6) | (3.5) | (3.8) | (5.0) |
| 4C,D | — | 4.52 | 6.72 | 8.70 | — | — |
|  |  | (~7) | (7) | (U) | (U) | (U) |
| 4A,B | 1.77 | 4.42 | 6.37 | 8.42 | 10.38 | 12.62 |
|  | (U) | (3.5) | (3.9) | (5.0) | (7.8) | (12) |
| 8H | 1.09 | 3.24 | 5.32 | 7.17 | 8.36 | 9.55 |
|  | (U) | (2.7) | (2.5) | (2.5) | (3.0) | (5.0) |
| 8D | 1.46 | 3.97 | 6.07 | 8.11 | 9.68 | 11.50 |
|  | (1.3) | (1.3) | (1.5) | (1.5) | (2.2) | (4.0) |

Note:
U indicates peak was unresolved and a peak width at half height could not be determined.

EXAMPLE 12

In a manner similar to Example 11, such resins may be for a clean separation of hydrogen from nitrogen for quantitative gas analysis. The gas chromatographic conditions were those described in Example 10. A mixture of the indicated gases was used as in Example 10. The resin used is that of Example 6D, which was polysulfonated as in Example 3, pyrolyzed at 500° C., and sieved to −20 +45 mesh. The hydrogen peak on the chromatograph was very small because of the similar filament response in the thermal conductivity detector between hydrogen and helium (carrier). The results of this example are in Table 11 below.

TABLE 11

| Gas | Retention Time (min) |
|---|---|
| Hydrogen | 0.18 |

TABLE 11-continued

| Gas | Retention Time (min) |
|---|---|
| Nitrogen | 0.36 |
| Carbon Monoxide | 0.67 |
| Methane | 2.25 |
| Carbon Dioxide | 5.25 |

Baseline separation of all of these components was achieved in this chromatogram. With use of nitrogen as a carrier, hydrogen and helium may be separated by such a column.

EXAMPLE 13

This example demonstrates the development of mesoporosity for resins pyrolyzed at 500° C. Separate preparations duplicating polysulfonated resins from Examples 3 and 6A were pyrolyzed at 500° C. by the techniques described in Example 5. Pore size distributions are given in Table 12 below.

TABLE 12

| Sample Source | BET Surface Area ($m^2/g$) | Pore Volume (cc/g) 0.43–0.6 nm | 0.6–3.5 nm | 3.5–30 nm |
|---|---|---|---|---|
| 3 | 517 | 0 | 0.0836 | 0.495 |
| 3 (repeat) | 509 | 0 | 0.0813 | 0.480 |
| 6A | 706 | 0 | 0.0704 | 0.311 |

EXAMPLE 14

This example demonstrates that further effects on the micro- and macroporosity may be realized by the application of activation technology. A portion of resins of Examples 8A and 4A were screened for a profile of weight loss versus contact time under the chosen pyrolysis conditions. The actual experimental samples were then activated at 800° in an atmosphere of steam for the selected time period, then allowed to cool under nitrogen. Pore size and surface area measurements were performed as described above, and compared with control samples which were pyrolyzed but not activated. The results of this example are in Table 13 below.

TABLE 13

| Sample | Resin Source | Wt. Loss | Pore Volume (cc/g) with a given pore diameter (by nm) 0.43–0.6 | 0.6–3.5 | 3.5–30 | BET Surface Area, $m^2/g$ |
|---|---|---|---|---|---|---|
| 14A | 4A | — | 0.146 | 0.0171 | 0.416 | 512 |
| 14B | 4A | 30 | 0 | 0.362 | 0.559 | 1190 |

TABLE 13-continued

| Sample | Resin Source | Wt. Loss | Pore Volume (cc/g) with a given pore diameter (by nm) | | | BET Surface Area, m²/g |
|---|---|---|---|---|---|---|
| | | | 0.43–0.6 | 0.6–3.5 | 3.5–30 | |
| 14C | 8A | — | 0.130 | 0.002 | 0.273 | 702 |
| 14D | 8A | 15 | 0.0201 | 0.238 | 0.344 | 722 |
| 14E | 8A | 30 | 0 | 0.310 | 0.448 | 1040 |

EXAMPLE 15

The following example demonstrates improvement in adsorptivity for activated resins of the present invention. Samples activated by the method of Example 14 were measured for surface area and for static carbon tetrachloride capacity. The static carbon tetrachloride capacities were measured by placing weighted samples of adsorbent in tared weighing bottles and measuring the weight gain by the bottles when stored in desiccators over neat $CCl^4$. Uptakes were measured as a function of activation. The results of this example are in Table 14 below.

TABLE 14

| Adsorbent Source | Burn-Off (%) | BET Surface Area (m²/g) | CCl₄ Capacity (mg/g) |
|---|---|---|---|
| Example 4A | 0 | 495 | 136 |
| | 14.0 | 669 | 515 |
| | 23.2 | 813 | 597 |
| | 33.4 | 1015 | 673 |
| | 37.0 | 1080 | 1000 |
| Example 8A | 0 | 455 | 118 |
| | 12.4 | 629 | 401 |
| | 17.5 | 653 | 485 |
| | 26.1 | 842 | 617 |
| | 29.9 | 863 | 663 |
| | 37.5 | 910 | 735 |

EXAMPLE 16

The non-polysulfonated resin of Example 5B was activated to 15% weight loss by the method of Example 14.

EXAMPLE 17

This example shows the dynamic adsorption capacity for adsorbents derived from polysulfonated polymers, both activated and non-activated, versus a non-polysulfonated activated control. Dynamic adsorption capacity was measured by passing an air stream containing a known quantity of vapor through a column containing the pyrolyzed resin, and measuring the concentration of vapor in the effluent air stream using a gas chromatograph with an appropriate detector.

The vapor-containing stream was produced by passing a stream of dry air through a closed container containing the liquid whose vapors are to be adsorbed. The vapor concentration thus produced was determined by passing a known volume of the air-vapor mixture through a tared, activated carbon column large enough to completely adsorb all the vapor, the column being weighed after passage of the mixture to determine the total weight of vapor in the known volume of air.

The adsorbent resins were placed in a 1-cm. diameter glass column fitted in the middle with a coarse filtered disk; the resin sample was at a bed depth of 3.8 cm. The air-vapor mixture was passed through the column at a flow rate of 1 liter/minute, equivalent to a linear flow rate of 21 cm/sec. The effluent was passed through a Hewlett-Packard Model 5880 gas chromatograph equipped with a flame ionization detector. The balance of the effluent was scrubbed through a bubble column of 4% sodium hydroxide and vented to an efficient hood.

Breakthrough, defined as the time at which the concentration of the challenge vapor in the effluent stream reaches 1% of that in the influent stream, was determined from the gas chromatograph. Sensitivity for the 2-chloroethyl isobutyl sulfide studied was approximately 10 micrograms/liter. The results were converted to capacity in milligrams of organic vapor/gram of resin, and are shown in Table 15 below.

TABLE 15

| Sample | Reference | Polysulfonated? | % Burn Off | Breakthrough Capacity (mg./g) |
|---|---|---|---|---|
| 17A | 4A | yes | 0 | 106 |
| 17B | 4A | yes | 14% | 288 |
| 17C | 16 | no | 15% | 199 |

The results show improved breakthrough capacity for the activated versus the non-activated polysulfonated resin; they further show improved breakthrough capacity for the activated polysulfonated resin versus a non-polysulfonated resin activated to the same extent of weight loss.

EXAMPLE 18

Other challenge vapors were used in the test method of Example 17. For diisopropyl fluorophosphate in a humid air stream, the vapor concentration was determined by scrubbing through a sodium hydroxide solution with calculation of the content from the fluoride content of the scrub solution, using a fluoride ion electrode. In some cases, the gas chromatograph was equipped with a nitrogen-phosphorus detector.

The following vapors, when measured by the techniques described in Example 16 and 17, show enhanced breakthrough capacity for the pyrolyzed polysulfonated resins versus a monosulfonated pyrolyzed resin starting from the same bead polymer, and show enhanced breakthrough when the pyrolyzed resin is further activated: methylene chloride, toluene, orthoxylene, diisopropyl fluorophosphate, and dimethyl methanephosphonate.

EXAMPLE 19

The following example shows activation of the adsorbent resin particles of the present invention by ammonia. A pyrolyzed resin was prepared by the process of Example 8A from the polysulfonated macroporous resin of Example 6A. The pyrolyzed resin was then further activated by a variant of the procedure of Example 14 wherein it was treated with a stream of gas which is ⅓ ammonia and ⅔ nitrogen at 800° C. for 1.5 hours. The resulting particulate material, for which only 1.3 % weight loss was realized on activation, exhibited a reduced sulfur content and an increased nitrogen content over the non-activated resin. Such an activated resin maintains the same surface area of the non-activated resin when measured by BET test procedures, and is useful in separative and adsorptive technology.

EXAMPLE 20

This example demonstrates utility of terpolymers in the present invention. Polymeric styrene/divinylbenzene copolymers or styrene/divinylbenzene/trimethylpropane trimethacrylate were prepared by the process of claim 1, were polysulfonated by the process of claim 3 and were pyrolyzed by the process of claim 4. Values of surface area measured by the technique of claim 4 are summarized below in Table 16. DVB is divinylbenzene, TMPTMA is trimethylolpropane trimethacrylate and MAmAlc is methyl amyl alcohol.

TABLE 16

| Sample | Crosslinker DVB (%) | Crosslinker TMPTMA (%) | Precipitant (MAmAlc) (%) | BET Surface Area ($m^2/g$) |
|---|---|---|---|---|
| 20A | 20 | 0 | 33 | 480 |
| 20B | 20 | 0 | 33 | 498 |
| 20C | 20 | 1 | 33 | 474 |

EXAMPLE 21

The following example describes an alternative method for the polysulfonation and pyrolysis reaction. Polymer beads prepared as in Example 1 were polysulfonated by the method of Example 3 and pyrolyzed as in Example 4 (800° C.) or Example 5 (500° C.) Other samples of the resins prepared as in Example 1 were imbibed with 4% oleum. The oleum was added dropwise at room temperature to dry resin with rapid stirring at a rate so that the oleum was adsorbed and the sample did not become wet. A vacuum of about 30 mm mercury was applied throughout the addition. About 1.8 moles of acid per mol of copolymer was added. The sample was then heated for two hours at 50° C., and was then pyrolyzed as in Examples 4 and 5. The imbibition/pyrolysis technique, although less effective at producing increased BET surface area than the separate polysulfonation/subsequent pyrolysis technique, produced polymers useful in chromatographic and adsorptive technology. The results of this example are in Table 17 below.

TABLE 17

| Example | Technique | Pyrolysis Temperature, °C. | BET Surface Area, $m^2/g$ |
|---|---|---|---|
| 21A | Ex 3 and 4 | 800 | 552 |
| 21B | Ex 21 and 4 | 800 | 426 |
| 21C | Ex 3 and 5 | 500 | 574 |
| 21D | Ex 21 and 5 | 500 | 296 |

EXAMPLE 22

This example demonstrates the ability of two such pyrolyzed polysulfonated resins to separate the noble gases. A resin similar to that described in Example 12 (Example 22A) was packed to a 6 m by 0.32 cm column. A resin (Example 22B) which was a repeat preparation of Example 4A was sieved to −20+45 mesh and packed to a similar column. The temperature profile consisted of a 8 min hold at 35° C. followed by increasing the temperature at a rate of 20° C./min to 175° C. and holding that temperature for at least 10 minutes. The carrier gas consisted of helium except for helium peak determination which used hydrogen as carrier. The detector was a thermal conductivity detector. The gas that was analyzed consisted of a mixture of approximately 1% each of He, $H_2$, Ne, $O_2$, $N_2$, Ar, CO, $CH_4$, $CO_2$, Kr and Xe. All peaks were cleanly resolved. The results of this example are shown in Table 18 below.

TABLE 18

| | Retention Time (min) | |
|---|---|---|
| Analyte | 6E Based Carbonaceous Adsorbent (Ex. 22A) | Example 4A Carbonaceous Adsorbent (Ex. 22B) |
| He | 0.65 | 0.56 |
| $H_2$ | 0.91 | 0.96 |
| Ne | 1.51 | 3.88 |
| $O_2$ | 2.32 | 4.72 |
| $N_2$ | 2.35 | 4.88 |
| Ar | 2.54 | 4.57 |
| CO | 3.27 | 7.28 |
| $CH_4$ | 9.44 | 13.13 |
| $CO_2$ | 14.24 | 15.87 |
| Kr | >20.0 | >20.0 |
| Xe | >20.0 | >20.0 |

We claim:

1. A process for preparing carbonaceous adsorbent particles which comprises pyrolyzing, at a temperature from about 300° C. to about 1200° C., particles of a polysulfonated macroporous, crosslinked, vinylaromatic polymer having multimodal pore-size distribution to a minimum micropore volume of about 0.02 $cm^3/g$.

2. The process of claim 1 wherein the minimum micropore volume is about 0.1 $cm^3/g$.

3. The process of claim 1 wherein the polysulfonated polymer particles contain, prior to pyrolysis, a minimum of about 1.04 times the sulfur content which may be introduced into the same polymer by monosulfonation.

4. The process of claim 3 wherein the minimum amount of sulfur is about 1 07 times the sulfur content which may be introduced into the same polymer by monosulfonation.

5. The process of claim 3 wherein the minimum amount of sulfur is about 1.16 times the sulfur content which may be introduced into the same polymer by monosulfonation.

6. The process of claim 1 wherein the pyrolysis is carried out in an inert atmosphere.

7. The process of claim 1 wherein the pyrolysis is carried out in an activating atmosphere.

8. The process of claim 7 wherein the activating atmosphere contains steam.

9. The process of claim 7 wherein the activating atmosphere contains ammonia.

10. A process for preparing activated carbonaceous adsorbent particles which comprises pyrolyzing, at a temperature of from about 300° C. to about 1200° C., particles of a polysulfonated macroporous, crosslinked, vinylaromatic polymer having multimodal pore-size distribution to a minimum micropore volume of about 0.02 $cm^3/g$, and subsequently treating the pyrolyzed particles with an activating atmosphere at an elevated temperature.

11. The process of claim 10 wherein the elevated temperature is from about 800° C. to about 1000° C. and the activating atmosphere contains steam.

12. The process of claim 10 wherein the elevated temperature is from about 800° C. to about 1000° C. and the activating atmosphere contains ammonia.

13. A process for preparing functionalized carbonaceous adsorbent particles which comprises pyrolyzing, at a temperature of from about 300° C. to about 1200° C., particles of a polysulfonated macroporous, crosslinked, vinylaromatic polymer having multimodal pore-size distribution to a minimum micropore volume of about 0.02 cm³/g, and subsequently treating the pyrolyzed particles with a functionalizing agent.

14. The process of claim 13 wherein the functionalizing agent is a sulfonating agent.

15. The process of claim 13 wherein the functionalizing agent is a chloromethylating agent.

16. The process of claim 15 wherein the treatment with the chloromethylating agent is followed by treatment with an aminating agent.

17. A process for preparing functionalized carbonaceous adsorbent particles which comprises pyrolyzing, at a temperature of from about 300° C. to about 1200° C., particles of a polysulfonated macroporous, crosslinked, vinylaromatic polymer having multimodal pore-size distribution to a minimum micropore volume of about 0.02 cm³/g, and subsequently treating the pyrolyzed particles with a desorbable, reactive agent.

18. The process of claim 17 wherein the reactive agent is hydrogen bromide.

* * * * *